United States Patent [19]

Ewbank

[11] Patent Number: 4,911,537

[45] Date of Patent: Mar. 27, 1990

[54] BIRD-WING PHASE CONJUGATOR USING MUTUALLY INCOHERENT LASER BEAMS

[75] Inventor: Mark D. Ewbank, Newbury Park, Calif.

[73] Assignee: Rockwell International Corporation, El Segundo, Calif.

[21] Appl. No.: 228,437

[22] Filed: Aug. 5, 1988

[51] Int. Cl.$^4$ .............................................. G02F 1/35
[52] U.S. Cl. .................................................... 350/354
[58] Field of Search ............... 350/353, 354, 355, 356; 372/21, 22

[56] References Cited

U.S. PATENT DOCUMENTS

| | | | |
|---|---|---|---|
| 4,500,855 | 2/1985 | Feinberg | 332/7.51 |
| 4,529,273 | 7/1985 | Cronin-Golomb et al. | 350/354 |
| 4,648,092 | 3/1987 | Ewbank et al. | 372/18 |
| 4,761,059 | 8/1988 | Yeh et al. | 350/354 |
| 4,773,739 | 9/1988 | Valley et al. | 350/355 X |

OTHER PUBLICATIONS

Chiou et al., Beam Cleanup Using Photorefractive Two-Wave Mixing, Optics Letters, vol. 10, p. 621, (1985).
Chiou et al., Laser Beam Cleanup Using Photorefractive Two-Wave Mixing and Optical Phase Conjugation, Optics Letters, vol. 11, p. 461, (1986).
Cronin-Golomb, et al., Passive Phase Conjugate Mirror Based on Self-Induced Oscillation in an Optical Ring Cavity, Appl. Phys. Ltrs., vol. 42, p. 919, (1983).
Eason, et al., Bistability and Noncommutative Behavior of Multiple-Beam Self-Pulsing and Self-Pumping in BaTiO$_3$, Optics Ltrs., vol. 12, p. 51, (1987).
Ewbank, et al., Fidelity of Passive Phase Conjugators, Society of Photo-Optical and Instrumentation Engineers, vol. 613, p. 11, (1986).
Ewbank, et al., Time Reversal by an Interferometer with Coupled Phase-Conjugate Reflectors, Optics Letters, vol. 10, p. 282, (1985).
Feinberg, Continuous-Wave Self-Pumped Phase Conjugator with Wide Field of View, Optics Letters, vol. 8, p. 480, (1983).
Feinberg, Self-Pumped, Continuous-Wave Phase Conjugator using Internal Reflection, Optics Letters, vol. 7, p. 486, (1982).
Lam, et al., Photorefractive-Index Gratings Formed by Nanosecond Optical Pulses in BaTiO$_3$, Optics Letters, vol. 6, p. 475, (1981).
Smout, et al., Analysis of Mutually Incoherent Beam Coupling in BaTiO$_3$, Optics Letters, vol. 12, p. 498, (1987).
Sternklar, et al., Beam Coupling and Locking of Lasers Using Photorefractive Four-Wave Mixing, Optics Letters, vol. 11, p. 528, (1986).
Weiss, et al., Double Phase-Conjugate Mirror: Analysis, Demonstration, and Applications, Optics Letters, vol. 12, p. 114, (1987).

Primary Examiner—Eugene R. LaRoche
Assistant Examiner—Nathan W. McCutcheon
Attorney, Agent, or Firm—John J. Deinken

[57] ABSTRACT

A nonlinear optical system for phase conjugating two mutually incoherent beams of light having the same nominal wavelength includes a photorefractive crystal having a preferred fanning direction, a first face whose surface normal is perpendicular to the preferred fanning direction, and a second face parallel to the first face. A first beam of coherent light having a wavelength $\lambda$ is incident on the first face of the crystal and makes an acute angle with the preferred fanning direction of the crystal, while a second beam of coherent light which is mutually incoherent with the first beam and has the same nominal wavelength is incident on the second face of the crystal and also makes an acute angle with the preferred fanning direction of the crystal. With this arrangement, the first beam and the second beam photorefractively fan toward a third face of the crystal to produce a set of shared photorefractive fanning holograms which channel light from the first and second beams toward the third face.

11 Claims, 4 Drawing Sheets

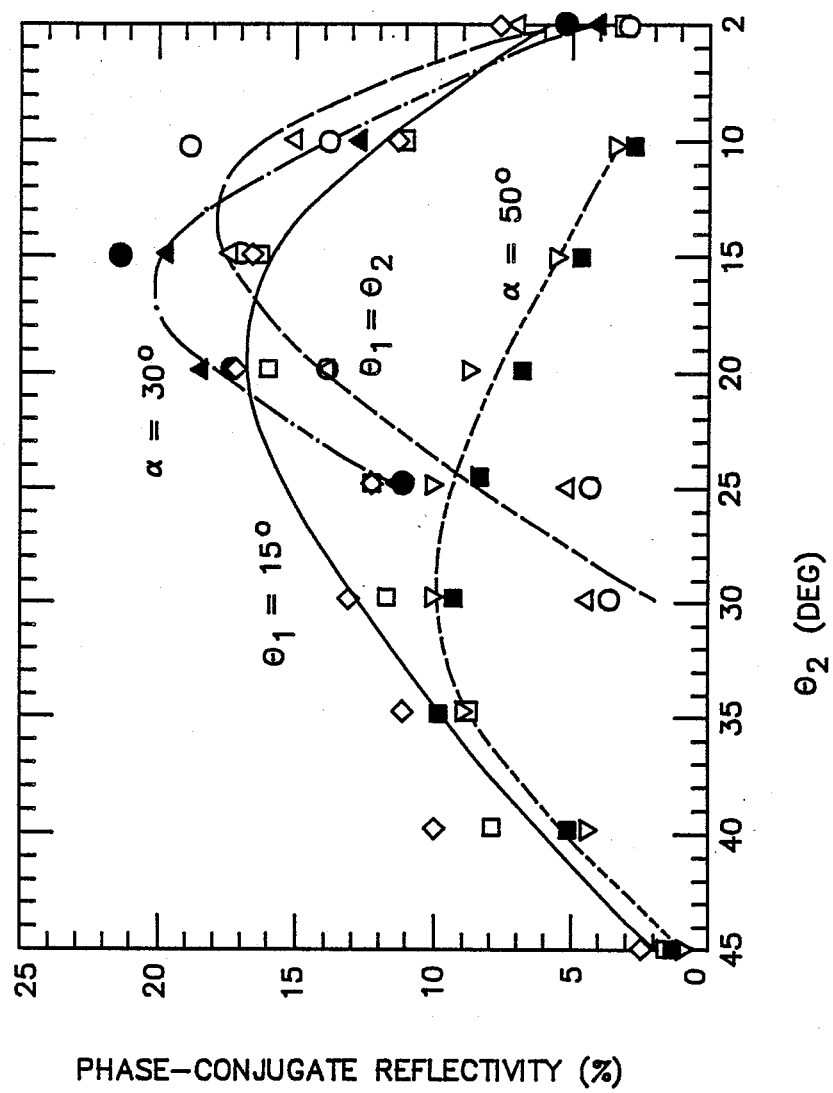

FIGURE 2

Phase-conjugate reflectivity as a function of the angle of incidence $\theta_2$ of beam #2 for constant $\theta_1 = 15°$ (solid curve: □, $\phi_1^*$; ◇, $\phi_2^*$); for the symmetric configuration $\theta_1 = \theta_2$ (long-dashed curve: △, $\phi_1^*$; ○, $\phi_2^*$); and for constant $\alpha = \theta_1 + \theta_2 = 30°$ (dashed-dotted curve: ▲, $\phi_1^*$; ●, $\phi_2^*$) or $\alpha = 50°$ (short-dashed curve; ▽, $\phi_1^*$; ■, $\phi_2^*$)

Phase-conjugate reflectivity as a function of incident beam intensity ratio for a constant optical power in beam #2 of 10 mW (O, $\phi_1^*$; Δ, $\phi_2^*$ for both beams incident ~3.5mm from the +c face and □, $\phi_1^*$; ◊, $\phi_2^*$ for both beams incident ~1.5mm from the +c face).

[△ is the reciprocal of the time between the two incident beams' turning on and the onset of a measurable ϕ* reflection; O is the reciprocal of the time between the onset of phase conjugation and the ϕ* reflectivity's reaching ∼ (1−e⁻¹) =63% of its maximum steady-state value].

BIRD-WING PHASE CONJUGATOR USING MUTUALLY INCOHERENT LASER BEAMS

BACKGROUND OF THE INVENTION

This invention involves the field of nonlinear optics and is concerned with optical phase conjugation involving mutually incoherent beams of light.

On a fundamental level, nonlinear optics is the study of the intraction of light with matter. This interaction is nonlinear because incident light can change the index of refraction in some materials, thereby affecting the frequency, intensity, and/or phase of the light itself. By providing a means to manipulate these properties of a laser beam, nonlinear optics has made possible new optical applications, including optical information processing, optical computing, laser beam control, and novel optical sensor designs.

The branch of nonlinear optics known as phase-conjugate optics deals with the generation, propagation, and application of phase-conjugated beams of light. If a light beam is considered as the motion of a family of wave fronts in space, the phase-conjugate of that light wave has exactly the same set of wavefronts as the initial wave, but the phase-conjugate wave moves in the opposite direction. Consequently, a phase-conjugate beam can be considered a time-reversed replica of an incident beam, capable of retracing the path of the incident beam. A device generating such a beam is known as a phase-conjugate mirror.

The photorefractive effect is a nonlinear optical phenomenon which occurs in photorefractive crystals, such as barium titanate ($BaTiO_3$) and strontium barium niobate (SBN), and can be used to achieve phase conjugation. When a photorefractive crystal is illuminated with two mutually coherent laser beams an interference fringe pattern is formed within the crystal. The fringe pattern causes a charge separation, which creates an electric field that, in turn, induces a change in the index of refraction via the Pockel's effect, resulting in a volume index grating that affects the propagation of the light beams in the crystal and allows the exchange of energy between the beams. This energy exchange by means of photorefractive phase conjugation is distinguished by the lack of any phase crosstalk, i.e., one beam can be amplified at the expense of the other without the aberrations and frequency differences of the donor beam being transferred to the acceptor beam. The discovery of this phenomenon has led to a variety of new applications, including beam processing techniques, such as image amplification, laser beam cleanup, and beam combining, as well as device structures such as ring oscillators, laser radars, and sensor protection devices.

The need for two mutually coherent laser beams to achieve photorefractive phase conjugation, however, has limited the usefulness of this technique in some applications. In an optical communications system, for example, it would be desirable for information to be transmitted between widely separated locations on laser beams generated at each location. Phase conjugation could be used, for example, to correct for aberrations caused by atmospheric turbulence. Since multiple lasers generally produce mutually incoherent beams, it would be desirable to be able to efficiently phase conjugate such mutually incoherent beams.

SUMMARY OF THE INVENTION

This invention allows mutually incoherent beams of light to be phase conjugated at a significantly higher speed than was possible in the prior art.

A nonlinear optical system for phase conjugating two mutually incoherent beams of light having the same nominal wavelength includes, according to this invention, a photorefractive crystal having a preferred fanning direction, a first face whose surface normal is perpendicular to the preferred fanning direction, and a second face parallel to the first face. A first beam of coherent light having a wavelength $\lambda$ is incident on the first face of the crystal and makes an acute angle with the preferred fanning direction of the crystal, while a second beam of coherent light which is mutually incoherent with the first beam and has the same nominal wavelength is incident on the second face of the crystal and also makes an acute angle with the preferred fanning direction of the crystal. With this arrangement, the first beam and the second beam photorefractive fan toward a third face of the crystal to produce a set of shared photorefractive fanning holograms which channel light from the first and second beams toward the third face.

In a more particular embodiment of the invention, using, for example, a $BaTiO_3$ crystal, the c-axis is the preferred fanning direction of the crystal and the first and second faces are a-faces of the crystal. Other photorefractive materials which may be used include $Ba_{2-x}Sr_xK_{1-7}Na_yNb_5O_{15}$, $KNbO_3$, and $Sr_{1-x}Ba_xNb_2O_6$. The system may also include an external electric field applied to the crystal to enhance the diffraction efficiency of the crystal.

A method of phase conjugating two mutually incoherent beams of light having the same nominal wavelength includes, according to this invention, the steps of:

providing a photorefractive crystal having a preferred fanning direction, a first face whose surface normal is perpendicular to the preferred fanning direction, and a second face parallel to the first face;

providing a first beam of coherent light having a wavelength $\lambda$;

directing the first beam onto the first face of the crystal such that the first beam makes an acute angle with the preferred fanning direction of the crystal;

providing a second beam of coherent light having a wavelength $\lambda$, the second beam being mutually incoherent with the first beam; and directing the second beam onto the second face of the crystal such that the second beam makes an acute angle with the preferred fanning direction, such that the first beam and the second beam photorefractivey fan toward a third face of the crystal to produce a set of shared photorefractive fanning holograms which channel light from the first and second beams toward the third face.

DESCRIPTION OF THE DRAWINGS

FIG. 2 is a plot of the phase-conjugate reflectivity of a bird-wing phase conjugator as a function of the angle of incidence of the second beam for several different conditions;

DESCRIPTION OF THE INVENTION

Phase conjugation in photorefractive crystals is a subject of growing interest in nonlinear optics. It is an outstanding feature of this invention to provide a high speed technique for achieving phase conjugation between mutually incoherent beams. Two mutually incoherent extraordinary beams of laser light are directed toward opposite faces of a photorefractive crystal, so that both beams can fan toward a common adjacent face of the crystal. These two sets of fanning beams are positioned to overlap and internally reflect off the adjacent face, producing a channel of light within the crystal which resembles the outline of a bird's wings. This "bird-wing" channel couples the two incident beams, producing phase-conjugate reflections that counter propagate relative to the two incident beams.

Figure 1:
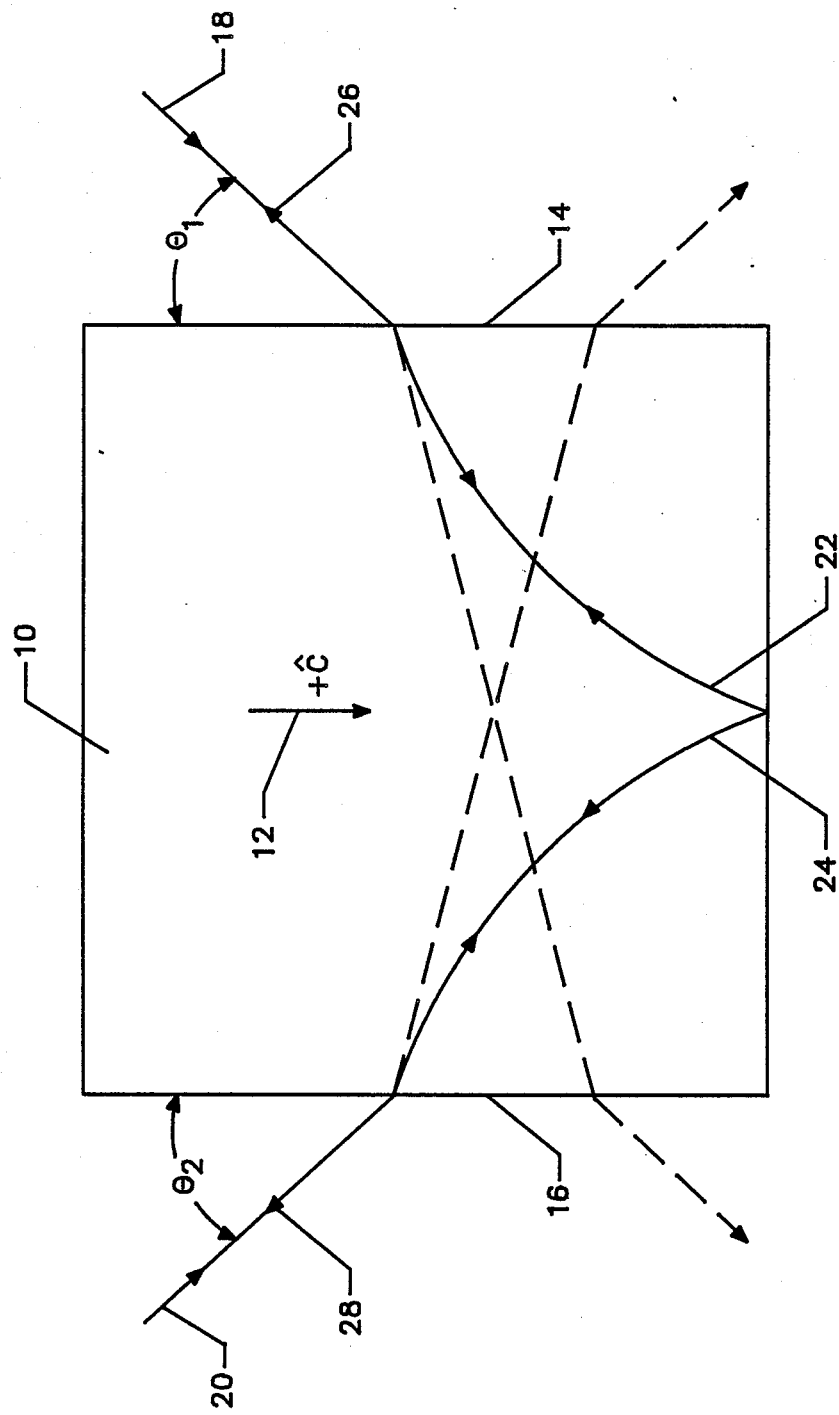
FIG. 1 is a cross-sectional schematic illustration of a nonlinear optical system which employs the bird-wing phase-conjugation of the present invention.

FIG. 1 is a cross-sectional schematic illustration of a nonlinear optical system which employs the bird-wing phase-conjugation of the present invention. A photorefractive $BaTiO_3$ crystal 10 has a c-axis 12 which is the preferred fanning direction of the crystal, a first a-face 14 whose surface normal is perpendicular to the c-axis, and a second a-face 16 parallel to the first a-face. A first beam of incoming coherent light 18 having a wavelength $\lambda$ is incident on the first a-face of the crystal and makes an acute angle $\theta_1$ with the $+c$-axis of the crystal. A second beam of incoming coherent light 20 is mutually incoherent with the first beam, but has the same nominal wavelength $\lambda$ as the first beam. The second beam 20 is incident on the second a-face 16 of the crystal, makes an acute angle $\theta_2$ with the $+c$-axis of the crystal, and makes an angle of $\alpha = \theta_1 + \theta_2$ with respect to the first beam 18.

With the geometry of the FIG. 1 device, each of the incident beams 18 and 20 can potentially form its own self-pumped phase conjugator (see Feinberg, Self-Pumped, Continuous-Wave Phase Conjugator using Internal Reflection, Optics Letters, Volume 7, Page 486 (1982)), either separately or simultaneously. If, however, the two incident beams are positioned to minimize this self-pumping process and the intensities of the beams are sufficiently balanced that each beam erases the self-pumped gratings of the other beam, then an alternate set of photorefractive gratings is formed. These holograms produce the "bird-wing" beam paths 22 and 24 in the crystal. With this arrangement, a phase-conjugate reflecting of the first beam 18, indicated by the arrow 26, is produced in a direction opposite to that of the first beam by the holographic diffraction of the second beam 20, while a phase-conjugate reflection of the second beam, indicated by the arrow 28, is produced in a direction opposite to that of the second beam by the holographic diffraction of the first beam. In other words, the phase-conjugate reflections of the beams 18 and 20 are derived solely from the direct readout of the volume holograms by beams 20 and 18, respectively.

In the bird-wing process, the two mutually incoherent incident beams 18 and 20 each produce photorefractive beam fanning toward a preferred fanning direction (which, in the case of $BaTiO_3$, is the $+c$-axis) within the crystal. The fanned light from one beam can Bragg diffract off the fanning gratings formed by the other beam. The fanning holograms generated from one incident beam will reinforce the fanning holograms produced by the second incident beam only if the light scattered from the first incident beam's hologram is the phase-conjugate of the second beam (see Ewbank, et al., Fidelity of Passive Phase Conjugators, Proceedings of the SPIE, Volume 613, Page 11 (1986)). In other words, all overlapping photorefractive fanning holograms produced independently by the two incident beams will wash out unless they are written by mutually phase-conjugated beams. There is no mutual coherence requirement on the two incident beams. Indeed, mutual incoherence between these beams is preferred since fewer photorefractive gratings are then competing within the crystal. Each of the two incident beams, however, must be able to Bragg diffract off the other beam's hologram, which implies that the incident beams must have the same nominal wavelength.

The source of the phase-conjugate reflections in the bird-wing interaction of this invention was investigated using interferometric techniques. A multilongitudinal-mode $Ar^+$ laser was used to generate a pair of incident light beams which were directed at a $BaTiO_3$ crystal. The optical path lengths were carefully matched since the coherence lengths of the two incident laser beams from the $Ar^+$ laser were less than approximately 3 cm. Two types of interferometers were constructed. Using the terminology of the device illustrated in FIG. 1, the first interferometer was arranged so that the first incident beam 18 attempted to interfere with its own phase-conjugate beam 26. In this experiment, no interference fringes were observed. The second type of interferometer interfered the first incident beam 18 with the second phase-conjugate beam 28; in this case, stationary interference fringes were clearly evident. Consequently, it was clear that a cross-readout mechanism was generating the phase-conjugate reflections. In other words, the first beam 18 reads the photorefractive hologram generating the phase-conjugate 28 of the second beam 20, and the second beam 20 reads the hologram generating the phase-conjugate 26 of the first beam 18. This cross-readout mechanism was confirmed by observing the temporal evolution of the phase-conjugate reflections when one of the two incident beams was blocked. Instantaneously blocking the first beam 18 resulted in the immediate disappearance of the second phase-conjugate beam, indicated by the arrow 28, and slow decay (typical of the erasure of an photorefractive hologram) of the first phase-conjugate beam, indicated by the arrow 26.

Imaging experiments have shown that the bird-wing interaction produces high-fidelity phase conjugation which is capable of correcting for severe linear optical distortions with no cross-talk between the beams. Image information was impressed on one or both of the incident beams by expanding an $Ar^+$ laser beam with a lens, transmitting the beam through an object transparency followed by a beam splitter, and focussing the beam into a $BaTiO_3$ crystal using a second lens. An optical distortion could be placed between the beam splitter and the crystal such that most of the distorted beam interacted in the conjugator. With this arrangement, the phase-conjugate beams retraced the optical paths, while the beam splitter reflected part of the phase-conjugate beam to the phase-conjugate image plane, which was located the same distance from the beam splitter as was the object transparency. Image cross-talk was eliminated in the process, even though the cross-readout process of the bird-wing technique generated the phase-conjugate reflections. These results show that he bird-wing technique of this invention provides a solution to the problem of providing optical communications between disparate locations using mutually incoherent sources of light.

Figure 3:
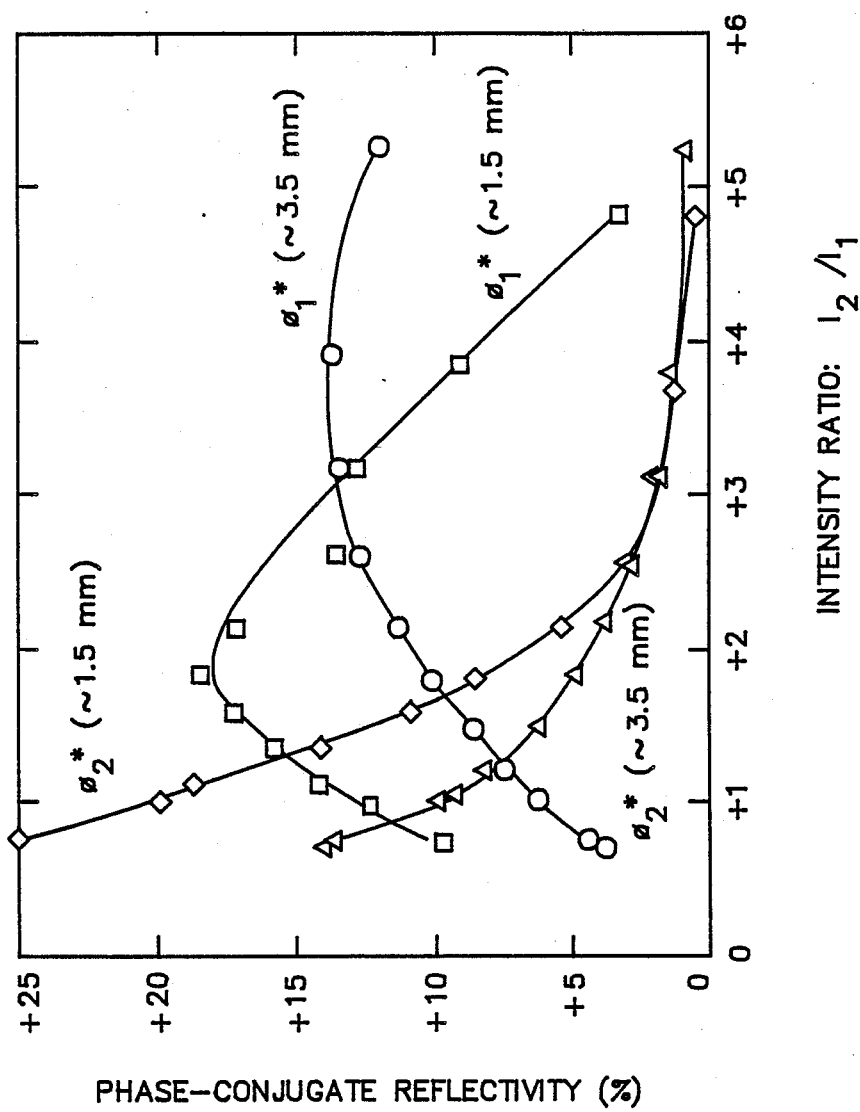
FIG. 3 is a plot depicting the phase-conjugate reflectivity of a bird-wing phase conjugator measured as a function of the intensity ratio of the incident beams for constant optical power in the second beam.
Figure 4:
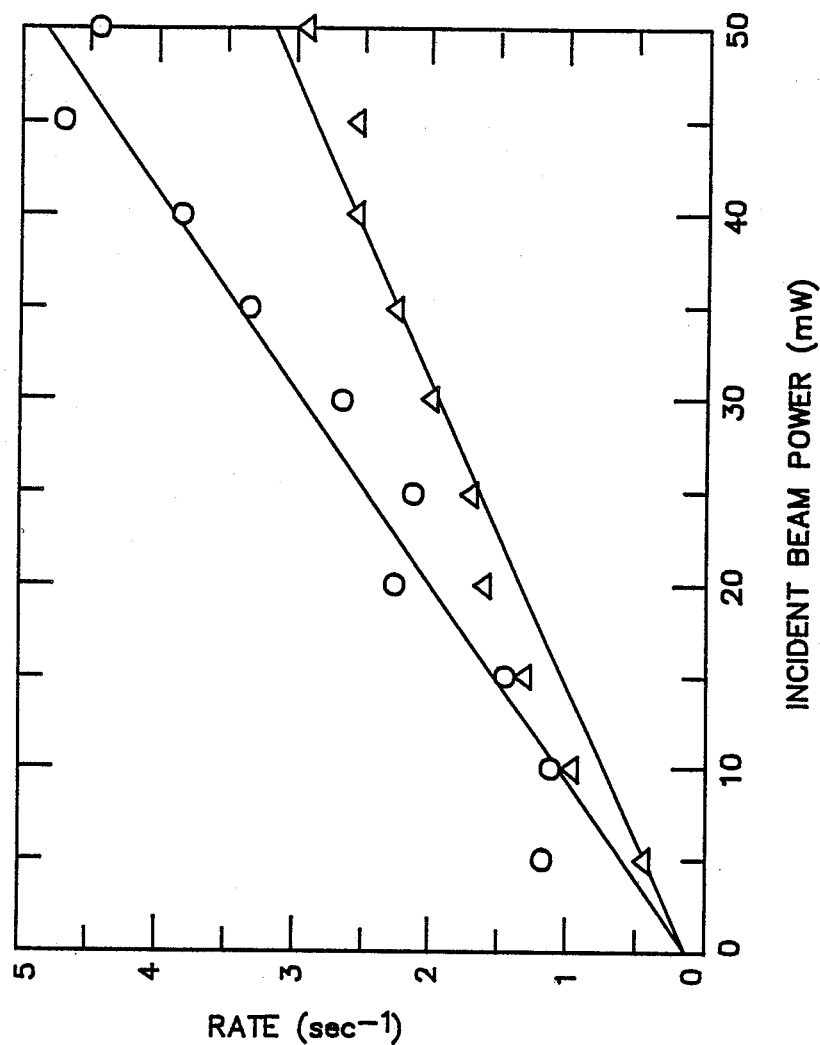
FIG. 4 is a plot of the time interval to the onset of phase-conjugate reflection and to steady-state phase conjugate reflection.

The performance of the bird-wing phase conjugator depends on a number of other parameters. FIGS. 2, 3, and 4 illustrate the effect a variations in these parameters. FIG. 2 is a plot of the phase-conjugate reflectivity of one bird-wing phase conjugator as a function of the angle of incidence $\theta_2$ of the second beam for several different conditions: (1) the angle of incidence of the first beam $\theta_1$ held at a constant angle of 15°, (2) the symmetric configuration where $\theta_1\theta_2$, (3) a constant angle $\alpha = \theta_1 + \theta_2$ of 30°, and (4) a constant angle $\alpha$ of 50°. FIG. 3 is a pot depicting the phase-conjugate reflectivity of a bird-wing phase conjugator measured as a function of the intensity ratio of the incident beams for constant optical power in the second beam of 10 mW. The reflectivity was measured for both beams incident approximately 3.5 mm from the +c-face and for both beams incident approximately 1.5 mm from the +c-face. In the measurements presented in FIGS. 2 and 3, except as otherwise noted, $\theta_1$ and $\theta_2$ were set equal to 15° and the incident beams had equal optical powers of 10 mW at $\lambda = 514.5$ nm focused to a beam diameter of approximately 50 um external to the BaTiO$_3$ crystal (which had dimensions of 5.4 mm × 5.3 mm × 5.1 mm). As indicated by FIG. 2, the angular acceptance for the bird-wing phase conjugator is fairly broad, although the magnitude of the phase-conjugate reflectivity which is obtained depends on the angles of incidence. The maximum phase-conjugate reflectivity occurs when the incident beams are near Brewster's angle (approximately 68° for BaTiO$_3$ at $\lambda = 514.5$ nm). FIG. 3 shows that the phase-conjugate reflectivity also varies with the transverse position of the incident beams on the opposite a-faces of the crystal. The reflectivity is higher (but fidelity is poorer) when the beams are incident close to he +c-face, as compared to positioning the incident beams farther from th +c-face. Presumably the improved fidelity at the 3.5 mm location was due to the longer interaction length (i.e., more photorefractive holograms participate), while the decrease in reflectivity was due to extra absorption from the longer bird-wing path and/or more Fresnel-reflection losses at the crystal's +c-face. This data shows that the bird-wing interaction can be achieved whether or not the intensities of the two incident beams are balanced, so long as the competing self-pumped process does not occur. The angles $\theta_1$, $\theta_2$, and $\alpha$ are not critical to the occurrence of the bird-wing interaction, although the efficiency and fluidity of the process are affected by changes in these angles. Additional experimentation has shown that phase-conjugate reflectivities exceeding 400% can be achieved through simultaneous optimization of the intensity beam ratio and the angles of incidence ($\theta_1$ and $\theta_2$). Using this optimized configuration, self-oscillation using the bird-wing technique has been observe. Self-oscillation entails replacing the laser generating the second beam 20 with a high reflectivity mirror, such that the second beam is self-generated from the first beam via the bird-wing path 22 and 24. Other tests have shown that the incident beam diameters, whether loosely or tightly focused, are not critical. Rather, the process is aperture limited by the size of the crystal being used.

Although other techniques for achieving interaction between mutually incoherent beams via photorefractive holographic coupling have been reported (see, e.g., Eason, et al., Bistability and Noncommutative Behavior of Multiple-Beam Self-Pulsing and Self-Pumping in BaTiO$_3$, Optics Letters, Volume 12, Page 51 (1987), Smout, et al., Analysis of Mutually Incoherent Beam Coupling in BaTiO$_3$, Optics Letters, Volume 12, Page 498 (1987), Sternklar, et al., Beam Coupling and Locking of Lasers using Photorefractive Four-Wave Mixing, Optics Letters, Volume 11, Page 528 (1986), and Weiss, et al., Optics Letters, Volume 12, Page 114 (1987)), the bird-wing technique of this invention is advantageous because its turn-on time i noticeably faster than that of other mutually-pumped phase conjugators for comparable incident optical powers. Grating formation times for the bird-wing integration were determined by first erasing all photorefractive gratings by a uniform beam of ordinary polarization, completely illuminating the entire crystal. Then, after the erase beam was blocked, the two mutually incoherent beams incident upon the crystal were turned on simultaneously. The time intervals to the onset of the phase-conjugate reflection (i.e., the first detectable phase-conjugate signal) and to the $(1 - e^{-1})$ point of the steady-state phase-conjugate reflection value were recorded. The rates are plotted in FIG. 4 as a function of the optical power in each incident beam. The turn-on time for the bird-wing phase conjugator (approximately 0.3 sec for 50 mW in each incident beam) was much faster than for other self-pumped and mutually pumped phase conjugators, although still approximately a factor of three longer than the photorefractive beam-fanning time. These shorter grating formation times are presumably due to the more efficient fanning in BaTiO$_3$ at the higher angles of incidence required by he bird-wing phase conjugator.

The preferred embodiments of this invention have been illustrated and described above. Modifications and additional embodiments, however, will undoubtedly be apparent to those skilled in the art. Other photorefractive crystals, for example, such as $Ba_{2-x}Sr_xK_{1-y}Na_yNb_5O_{15}$, $KNbO_3$, and $Sr_{1-x}Ba_xNb_2O_6$, could be substituted for the BaTiO$_3$ crystal mentioned above. Another possible embodiment would use an external electric field applied to the crystal to enhance the diffraction efficiency of the crystal. In addition, optical wedge or prism elements could be added to the system to modified the angles of incidence of the incident beams within the photorefractive crystal. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of he invention.

The teaching of the following documents, which are referred to herein, is incorporated by reference:

Eason, et al., Bistability and Noncommutative Behavior of Multiple-Beam Self-Pulsing and Self-Pumping in BaTiO$_3$, Optics Letters, Volume 12, Page 51 (1987);

Ewbank, et al., Fidelity of Passive Phase Conjugators, Proceedings of the SPIE, Volume 613, Page 11 (1986);

Feinberg, Self-Pumped, Continuous-Wave Phase Conjugator using Internal Reflection, Optics Letters, Volume 7, Page 486 (1982);

Smout, et al., Analysis of Mutually Incoherent Beam Coupling in BaTiO$_3$, Optics Letters, Volume 12, Page 498 (1987);

Sternklar, et al., Beam Coupling and Locking of Lasers using Photorefractive Four-Wave Mixing, Optics Letters, Volume 11, Page 528 (1986);

Weiss, et al., Optics Letters, Volume 12, Page 114 (1987)

I claim:

1. A nonlinear optical system for phase conjugating two mutually incoherent beams of light having the same nominal wavelength, comprising:

a photorefractive crystal having a preferred fanning direction, a first face whose surface normal is perpendicular to the preferred fanning direction, and a second face parallel to the first face;

a first beam of coherent light having a wavelength $\lambda$ and being positioned such that the first beam is incident on the first face of the crystal and makes an acute angle with the preferred fanning direction of the crystal; and a second beam of coherent light which is mutually incoherent with the first beam, the second beam having the same nominal wavelength $\lambda$ and being positioned such that the second beam is incident on the second face of the crystal and makes an acute angle with the preferred fanning direction of the crystal, such that the first beam and the second beam photorefractively fan toward a third face of the crystal to produce a set of shared photorefractive fanning holograms which channel light from the first and second beams toward the third face.

2. The system of claim 1, wherein the preferred fanning direction of the crystal further comprises the c-axis and wherein the first and second faces further comprise a-faces of the crystal.

3. The system of claim 2, wherein the crystal further comprises a BaTiO$_3$ crystal.

4. The system of claim 1, wherein the crystal further comprises a crystal selected from the group consisting of Ba$_{2-x}$Sr$_x$K$_{1-y}$Na$_y$Nb$_5$O$_{15}$, BaTiO$_3$, KNbO$_3$, and Sr$_{1-x}$Ba$_x$Nb$_2$O$_6$.

5. The system of claim 1, further comprising an external electric field applied to the crystal to enhance the diffraction efficiency of the crystal.

6. A nonlinear optical system for phase conjugating two mutually incoherent beams of light having the same nominal wavelength, comprising:

a photorefractive BaTiO$_3$ crystal having a c-axis, a +c-face whose surface normal is parallel to the c-axis, a first a-face whose surface normal is perpendicular to the c-axis, and a second a-face parallel to the first a-face;

a first beam of coherent light having a wavelength $\lambda$ and being positioned such that the first beam is incident on the first a-face of the crystal and makes an acute angle with the c-axis of the crystal; and a second beam of coherent light which is mutually incoherent with the first beam, the second beam having the same nominal wavelength $\lambda$ and being positioned such that the second beam is incident on the second a-face of the crystal and makes an acute angle with the c-axis of the crystal, such that the first beam and the second beam photorefractively fan toward the +c-face of the crystal to produce a set of shared photorefractive fanning holograms which channel light from the first and second beams toward the +c-face.

7. A method of phase conjugating two mutually incoherent beams of light having the same nominal wavelength, comprising the steps of:

providing a photorefractive crystal having a preferred fanning direction, a first face whose surface normal is perpendicular to the preferred fanning direction, and a second face parallel to the first face;

providing a first beam of coherent light having a wavelength $\lambda$;

directing the first beam onto the first face of the crystal such that the first beam makes an acute angle with the preferred fanning direction of the crystal;

providing a second beam of coherent light having a wavelength $\lambda$, the second beam being mutually incoherent with the first beam; and directing the second beam onto the second face of the crystal such that the second beam makes an acute angle with the preferred fanning direction, such that the first beam and the second beam photorefractively fan toward a third face of the crystal to produce a set of shared photorefractive fanning holograms which channel light from the first and second beams toward the third face.

8. The method of claim 7, wherein the preferred fanning direction of the crystal further comprises the c-axis and wherein the first and second faces further comprise a-faces of the crystal.

9. The method of claim 8, wherein the crystal further comprises a BaTiO$_3$ crystal.

10. The method of claim 7, wherein the crystal further comprises a crystal selected from the group consisting of Ba$_{2-x}$Sr$_x$K$_{1-y}$Na$_y$Nb$_5$O$_{15}$, BaTiO$_3$, KNbO$_3$, and Sr$_{1-x}$Ba$_x$Nb$_2$O$_6$.

11. The method of claim 7, further comprising the step of applying an external electric field to the crystal to enhance the diffraction efficiency of the crystal.

* * * * *